United States Patent
Yu et al.

(10) Patent No.: US 11,172,471 B2
(45) Date of Patent: Nov. 9, 2021

(54) RESOURCE RESERVATION

(71) Applicant: Motorola Mobility LLC, Chicago, IL (US)

(72) Inventors: Xiaodong Yu, Beijing (CN); Haipeng Lei, Beijing (CN); Hongchao Li, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/476,238

(22) PCT Filed: Jan. 5, 2017

(86) PCT No.: PCT/CN2017/070311
§ 371 (c)(1),
(2) Date: Jul. 5, 2019

(87) PCT Pub. No.: WO2018/126403
PCT Pub. Date: Jul. 12, 2018

(65) Prior Publication Data
US 2019/0320435 A1    Oct. 17, 2019

(51) Int. Cl.
*H04W 72/04*    (2009.01)
(52) U.S. Cl.
CPC .............................. *H04W 72/0413* (2013.01)
(58) Field of Classification Search
CPC . H04W 72/04; H04W 72/0413; H04W 72/10; H04W 72/12; H04W 72/1242; H04W 74/006
See application file for complete search history.

(56) References Cited

U.S. PATENT DOCUMENTS

| | | | | |
|---|---|---|---|---|
| 10,667,267 B2* | 5/2020 | Li | ............ | H04W 52/245 |
| 10,694,527 B2* | 6/2020 | Xu | ............ | H04W 28/0215 |
| 11,026,246 B2* | 6/2021 | Wu | ............ | H04W 72/1242 |
| 2016/0352551 A1 | 12/2016 | Zhang et al. | | |
| 2018/0027576 A1* | 1/2018 | Kowalski | ............ | H04W 72/0446 370/329 |

(Continued)

FOREIGN PATENT DOCUMENTS

| | | | | |
|---|---|---|---|---|
| CN | 110326349 A | * | 10/2019 | ........ H04W 72/1284 |
| EP | 3566516 A1 | * | 11/2019 | ........... H04L 1/0013 |

(Continued)

OTHER PUBLICATIONS

Nokia et al., Enhanced semi-persistent scheduling for 5G URLLC, Nov. 14, 2016, 3GPP, 3GPP TSG-RAN WG1 #87, Tdoc: R1-1612251, http://www.3gpp.org/ftp/TSG_RAN/WG1_RL1/TSGR1_87/Docs/R1-1612251.zip (Year: 2016).*

(Continued)

*Primary Examiner* — Eric Nowlin
(74) *Attorney, Agent, or Firm* — Kunzler Bean & Adamson

(57) ABSTRACT

Apparatuses, methods, and systems are disclosed for resource reservation. One apparatus (200) includes a receiver (212) that receives (802) an indication of resource reservation for uplink communication. The indication is based on information reported from a first remote unit. The apparatus (200) also includes a processor (202) that determines (804) a resource based on the indication. The apparatus (200) includes a transmitter (210) that transmits (806) data on the resource.

22 Claims, 9 Drawing Sheets

(56) References Cited

U.S. PATENT DOCUMENTS

| | | | | |
|---|---|---|---|---|
| 2018/0184431 | A1* | 6/2018 | Li | H04W 72/1242 |
| 2018/0184468 | A1* | 6/2018 | Chien | H04W 72/0406 |
| 2019/0124634 | A1* | 4/2019 | Li | H04W 76/14 |
| 2019/0268938 | A1* | 8/2019 | Zhao | H04L 5/0048 |
| 2019/0289624 | A1* | 9/2019 | Dudda | H04W 72/1289 |
| 2019/0313406 | A1* | 10/2019 | Liu | H04W 72/0446 |
| 2019/0327757 | A1* | 10/2019 | Oteri | H04L 5/0053 |
| 2019/0335448 | A1* | 10/2019 | Yang | H04W 72/0413 |
| 2019/0342769 | A1* | 11/2019 | Li | H04W 28/18 |
| 2019/0357122 | A1* | 11/2019 | Li | H04W 76/18 |
| 2019/0387538 | A1* | 12/2019 | Du | H04W 72/121 |
| 2021/0022184 | A1* | 1/2021 | Hosseini | H04W 72/10 |
| 2021/0029723 | A1* | 1/2021 | Wu | H04W 72/1242 |
| 2021/0050931 | A1* | 2/2021 | Hahn | H04L 1/189 |
| 2021/0050950 | A1* | 2/2021 | Zhou | H04L 1/1861 |

FOREIGN PATENT DOCUMENTS

| | | | | |
|---|---|---|---|---|
| GB | 201802058 | * | 3/2018 | H04W 72/1278 |
| GB | 2570899 A | * | 8/2019 | H04W 72/1278 |
| WO | WO-2018129325 A1 | * | 7/2018 | H04W 72/0406 |

OTHER PUBLICATIONS

Huawei et al., WF on dynamic resource sharing between eMBB and URLLC in DL, Oct. 10, 2016, 3GPP, 3GPP TSG RAN WG1 #86bis, Tdoc: R1-1610995, http://www.3gpp.org/ftp/TSG_RAN/WG1_RL1/TSGR1_86b/Docs/R1-1610995.zip (Year: 2016).*

LG Electronics et al., WF on Semi-static resource sharing between URLLC and eMBB, Oct. 10, 2016, 3GPP TSG RAN WG1 Meeting #86bis, Tdoc: R1-1610952, http://www.3gpp.org/ftp/TSG_RAN/WG1_RL1/TSGR1_86b/Docs/R1-1610952.zip (Year: 2016).*

Samsung et al., WF on Multiplexing eMBB and URLLC in DL, Oct. 10, 2016, 3GPP, 3GPP TSG RAN WG1 Meeting #86bis, Tdoc: R1-1610902, http://www.3gpp.org/ftp/TSG_RAN/WG1_RL1/TSGR1_86b/Docs/R1-1610902.zip (Year: 2016).*

Huawei et al., Support of URLLC in UL, Oct. 10, 2016, 3GPP, 3GPP TSG RAN WG1 Meeting #86bis, Tdoc: R1-1610737, http://www.3gpp.org/ftp/TSG_RAN/WG1_RL1/TSGR1_86b/Docs/R1-1610737.zip (Year: 2016).*

Nokia et al., Semi-persistent scheduling for 5G new radio URLLC, Oct. 10, 2016, 3GPP, 3GPP TSG-RAN WG1 #86bis, Tdoc: R1-1609748, http://www.3gpp.org/ftp/TSG_RAN/WG1_RL1/TSGR1_86b/Docs/R1-1609748.zip (Year: 2016).*

Intel Corporation, On eMBB and URLLC multiplexing, Oct. 10, 2016, 3GPP, 3GPP TSG RAN WG1 Meeting #86bis, Tdoc: R1-1609546, http://www.3gpp.org/ftp/TSG_RAN/WG1_RL1/TSGR1_86b/Docs/R1-1609546.zip (Year: 2016).*

ETRI, Multiplexing of eMBB and URLLC transmissions, Oct. 10, 2016, 3GPP, 3GPP TSG RAN WG1 Meeting #86bis, Tdoc: R1-1609392, http://www.3gpp.org/ftp/TSG_RAN/WG1_RL1/TSGR1_86b/Docs/R1-1609392.zip (Year: 2016).*

Samsung, Multiplexing UL URLLC and eMBB, Oct. 10, 2016, 3GPP, 3GPP TSG RAN WG1 #86bis, Tdoc: R1-1609056, http://www.3gpp.org/ftp/TSG_RAN/WG1_RL1/TSGR1_86b/Docs/R1-1609056.zip (Year: 2016).*

Sony, Multiplexing eMBB and URLLC Transmissions, Oct. 10, 2016, 3GPP, 3GPP TSG RAN WG1 Meeting #86bis, Tdoc: R1-1608942, http://www.3gpp.org/ftp/TSG_RAN/WG1_RL1/TSGR1_86b/Docs/R1-1608942.zip (Year: 2016).*

PCT/CN2017/070311, "Notification of Transmittal of the International Search Report and the Written Opinion of the International Searching Authority, or the Declaration", International Searching Authority, dated Aug. 30, 2017, pp. 1-11.

LG Electronics, "On multiplexing between eMBB and URLLC", 3GPP TSG RAN WG1 Meeting #87 R1-1611849, Nov. 14-18, 2016, pp. 1-12.

Intel Corporation, "UL URLLC transmission schemes", 3GPP TSG RAN WG1 Meeting #87 R1-1612004, Nov. 14-18, 2016, pp. 1-7.

* cited by examiner

RESOURCE RESERVATION

FIELD

The subject matter disclosed herein relates generally to wireless communications and more particularly relates to resource reservation.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, URLLC may have a data payload that is small. According to some configurations, URLLC may have a periodically occurring packet arrival rate and a packet size may be 32 bytes, 50 bytes, 200 bytes, and so forth.

In certain configurations, for URLLC, the user plane latency may be 0.5 ms for UL, and 0.5 ms for DL. In various configurations, for eMBB, the user plane latency may be 0.4 ms for UL and DL. Moreover, URLLC reliability may be evaluated by a success probability of transmitting X bytes within 1 ms. This may be the time it takes to deliver a small data packet from the radio protocol layer 2/3 service data unit ("SDU") ingress point to the radio protocol layer 2/3 SDU egress point of the radio interface, at a certain channel quality (e.g., coverage-edge). In various configurations, the target for reliability may be $1-10^{-5}$ within 1 ms. In certain configurations, a general URLLC reliability requirement for one transmission of a packet may be 1-10-5 for X bytes (e.g., 20 bytes) with a user plane latency of 1 ms.

In some configurations, URLLC and eMBB services may be multiplexed in a same carrier. Data collisions may occur in configurations in which URLLC and eMBB are multiplexed.

BRIEF SUMMARY

Apparatuses for resource reservation are disclosed. Methods and systems also perform the functions of the apparatus. In one embodiment, the apparatus includes a receiver that receives an indication of resource reservation for uplink communication. In various embodiments, the indication is based on information reported from a first remote unit. The apparatus also includes a processor that determines a resource based on the indication. In certain embodiments, the apparatus includes a transmitter that transmits data on the resource.

In one embodiment, the receiver receives the indication of resource reservation for uplink communication in downlink control information. In a further embodiment, the indication includes a single bit indicating whether an uplink communication resource pattern is used. In certain embodiments, the receiver receives information indicating the uplink communication resource pattern. In some embodiments, the uplink communication resource pattern is predefined or preconfigured.

In various embodiments, the indication includes multiple bits indicating a selected uplink communication resource pattern of multiple uplink communication resource patterns. In some embodiments, the processor identifies the selected uplink communication resource pattern of the multiple uplink communication resource patterns using the indication.

A method for resource reservation, in one embodiment, includes receiving an indication of resource reservation for uplink communication. In certain embodiments, the indication is based on information reported from a first remote unit. The method also includes determining a resource based on the indication. The method includes transmitting data on the resource.

In one embodiment, an apparatus includes a receiver that receives information from a first remote unit. In various embodiments, the information includes a traffic type, a traffic period, a payload size, a delay tolerance, or some combination thereof. In certain embodiments, the apparatus includes a processor that generates an indication of resource reservation for uplink communication based on the information. In some embodiments, the apparatus includes a transmitter that transmits the indication of resource reservation for uplink communication to broadband second remote unit.

In one embodiment, the transmitter transmits the indication of resource reservation for uplink communication in downlink control information. In a further embodiment, the indication includes a single bit indicating whether an uplink communication resource pattern is used. In certain embodiments, the transmitter transmits information indicating the uplink communication resource pattern. In some embodiments, the uplink communication resource pattern is predefined or preconfigured. In various embodiments, the indication includes multiple bits indicating a selected uplink communication resource pattern of multiple uplink communication resource patterns.

A method for resource reservation, in one embodiment, includes receiving information from a first remote unit. In certain embodiments, the information includes a traffic type, a traffic period, a payload size, a delay tolerance, or some combination thereof. The method also includes generating an indication of resource reservation for uplink communication based on the information. The method includes transmitting the indication of resource reservation for uplink communication to broadband second remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
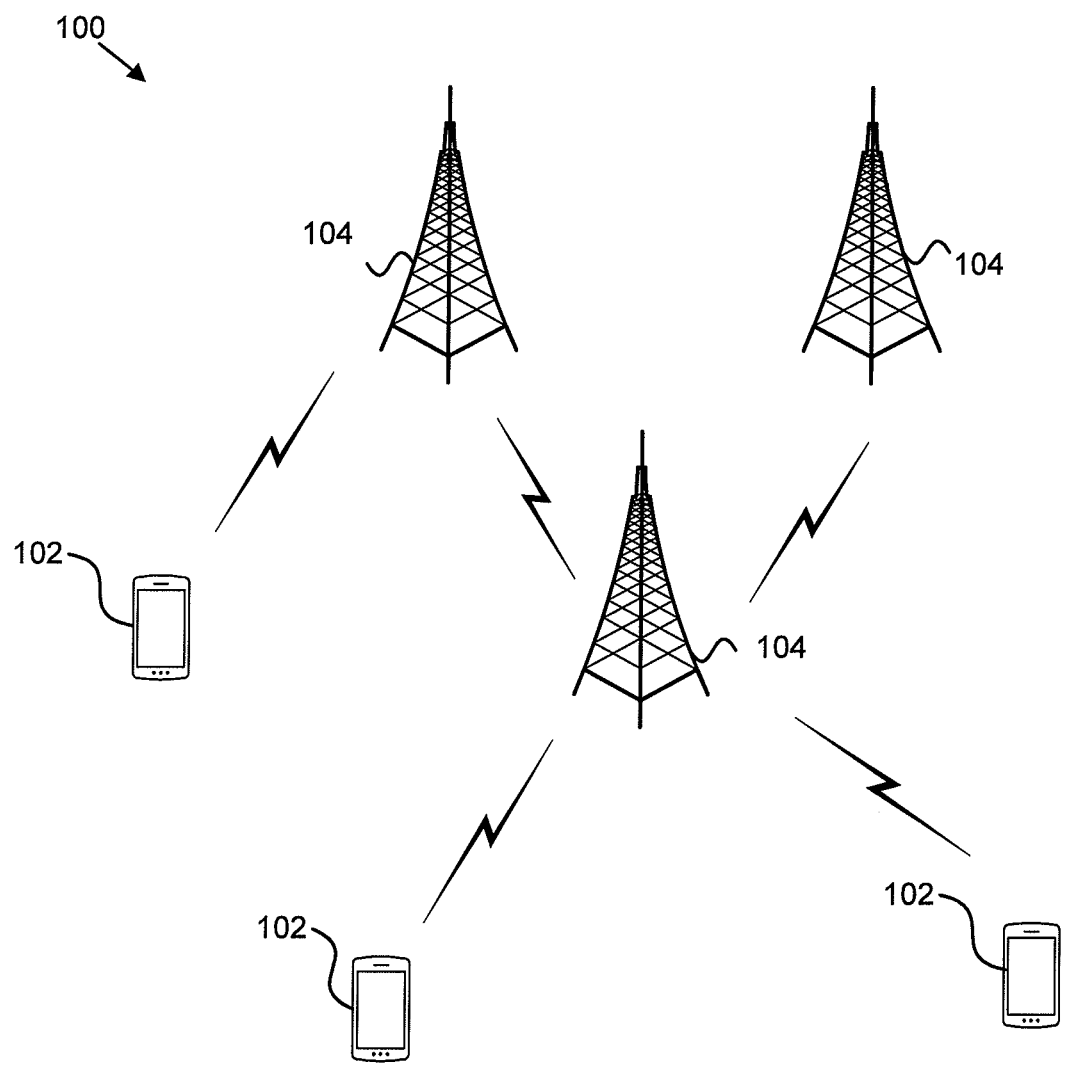
FIG. 1 is a schematic block diagram illustrating one embodiment of a wireless communication system for dynamic resource reservation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for dynamic resource reservation. As used herein, the term "dynamic" may mean changeable as desired during operation. For example, a "dynamic resource reservation" may be a resource reservation that may change during operation based on one or more resources to be reserved. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive information from an ultra-reliable and low latency communication remote unit. The information may include a traffic type, a traffic period, a payload size, a delay tolerance, or some combination thereof. In some embodiments, the base unit 104 may generate an indication of dynamic resource reservation for ultra-reliable and low latency communication based on the information. In various embodiments, the base unit 104 may transmit the indication of dynamic resource reservation for ultra-reliable and low latency communication to an enhanced mobile broadband remote unit. Accordingly, a base unit 104 may be used for dynamic resource reservation.

In another embodiment, a remote unit 102 may receive an indication of dynamic resource reservation for ultra-reliable and low latency communication. The indication may be based on information reported from an ultra-reliable and low latency communication remote unit. The remote unit 102 may determine a resource based on the indication. The remote unit 102 may transmit data on the resource. Accordingly, a remote unit 102 may be used for dynamic resource reservation.

Figure 2:
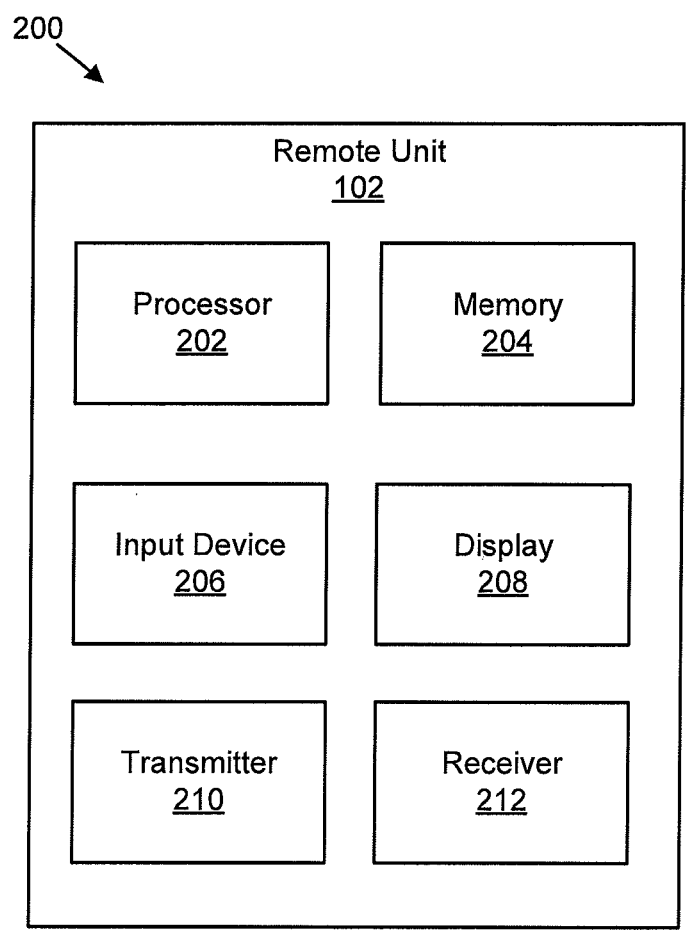
FIG. 2 is a schematic block diagram illustrating one embodiment of an apparatus that may be used for dynamic resource reservation.

FIG. 2 depicts one embodiment of an apparatus 200 that may be used for dynamic resource reservation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a resource based on an indication. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to resources. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the receiver 212 may be used to receive an indication of dynamic resource reservation for ultra-reliable and low latency communication. The indication may be based on information reported from an ultra-reliable and low latency communication remote unit. In certain embodiments, the transmitter 210 may be used to transmit data on a resource determined based on the indication. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
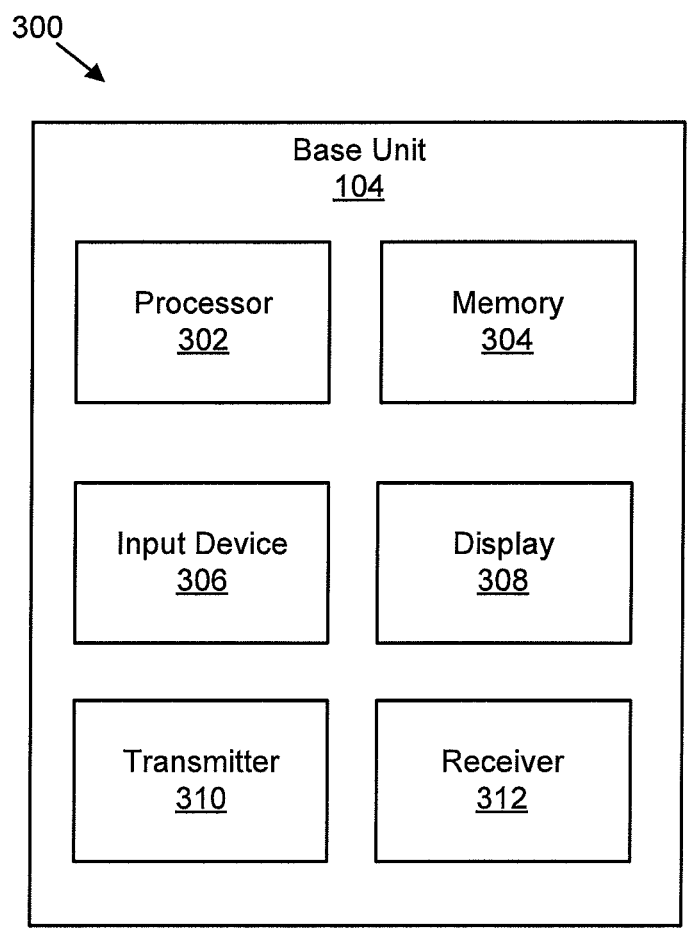
FIG. 3 is a schematic block diagram illustrating one embodiment of an apparatus that may be used for dynamic resource reservation.

FIG. 3 depicts one embodiment of an apparatus 300 that may be used for dynamic resource reservation. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 is used to receive information from an ultra-reliable and low latency communication remote unit (e.g., a remote unit that communicates via URLLC). In such embodiments, the information may include a traffic type, a traffic period, a payload size, a delay tolerance, or some combination thereof. In certain embodiments, the processor 302 may generate an indication of dynamic resource reservation for ultra-reliable and low latency communication based on the information. In various embodiment, the transmitter 310 is used to transmit the indication of dynamic resource reservation for ultra-reliable and low latency communication to an enhanced mobile broadband remote unit (e.g., a remote unit that communicates via eMBB). Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
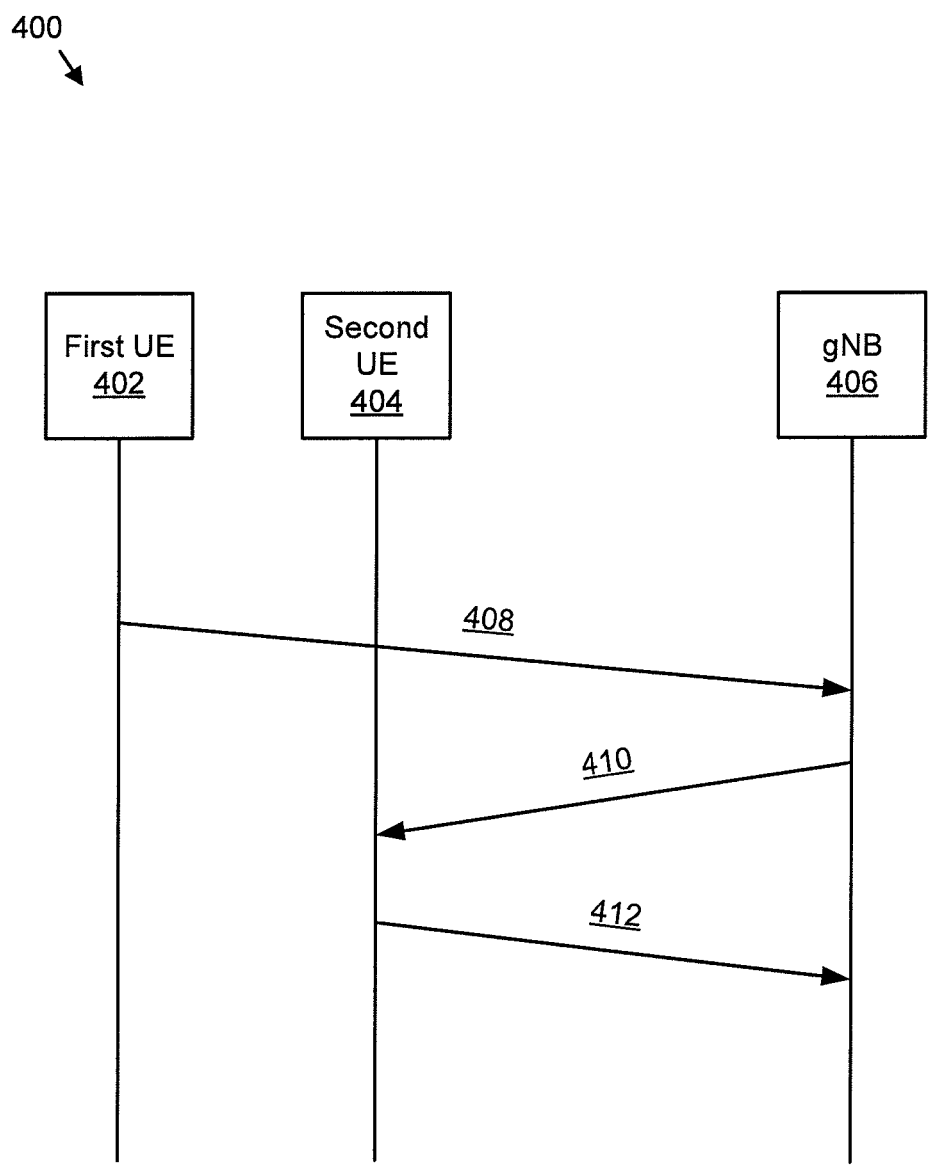
FIG. 4 illustrates one embodiment of communications for dynamic resource reservation.

FIG. 4 illustrates one embodiment of communications 400 for dynamic resource reservation. Specifically, communications 400 between a first UE 402, a second UE 404, and a gNB 406 are illustrated. The first UE 402 may be a URLLC UE (e.g., an URLLC remote unit 102) and the second UE 404 may be an eMBB UE (e.g., an eMBB remote unit 102). The communications 400 may facilitate dynamic resource reservation for multiplexing eMBB and URLLC.

A first communication 408 may include a message sent from the first UE 402 to the gNB 406 including information, such as a traffic type, a traffic period, a payload size, a delay tolerance, or some combination thereof. The gNB 406 may generate an indication of dynamic resource reservation for URLLC based on the information.

A second communication 410 may include a message sent from the gNB 406 to the second UE 404 including the indication of dynamic resource reservation for URLLC. In certain embodiments, the second communication 410 may include eMBB control information having the indication. The dynamic indicator may, in some embodiments, indicate a resource reservation of resources to be used by URLLC. The second UE 404 may be able to determine the resources to be used by URLLC by decoding its own eMBB control information. The dynamic indicator may be single bit or multiple bits indicating a reservation pattern. In certain embodiments, the second communication 410 may include an UL-grant including an indicator of resource reservation to inform the second UE 404 to puncture the transmission and/or transmit with less power (e.g., including down to zero) in an overlapped resource portion (e.g., subslots) to facilitate URLLC UL transmission. In some embodiments, the second communication 410 may include an indicator to inform the second UE 404 to perform rate matching via a predefined or preconfigured resource pattern. In various embodiments, the second communication 410 may include a resource reservation pattern for both DL and UL. The resource reservation pattern for DL and UL may, in certain embodiments, include an UL resource pattern that may cover all symbols of one TTI for eMBB and for DL may avoid overlapping with a DL and/or UL control part.

The second UE 404 may determine a resource based on the indication. For example, the second UE 404 may determine whether resources for its own eMBB communication overlap with URLLC communication of the first UE 402, and may adjust timing of eMBB communication accordingly (e.g., determine the resource for eMBB communication). A third communication 412 may include data transmitted from the second UE 404 to the gNB 406 on the resource.

Figure 5:
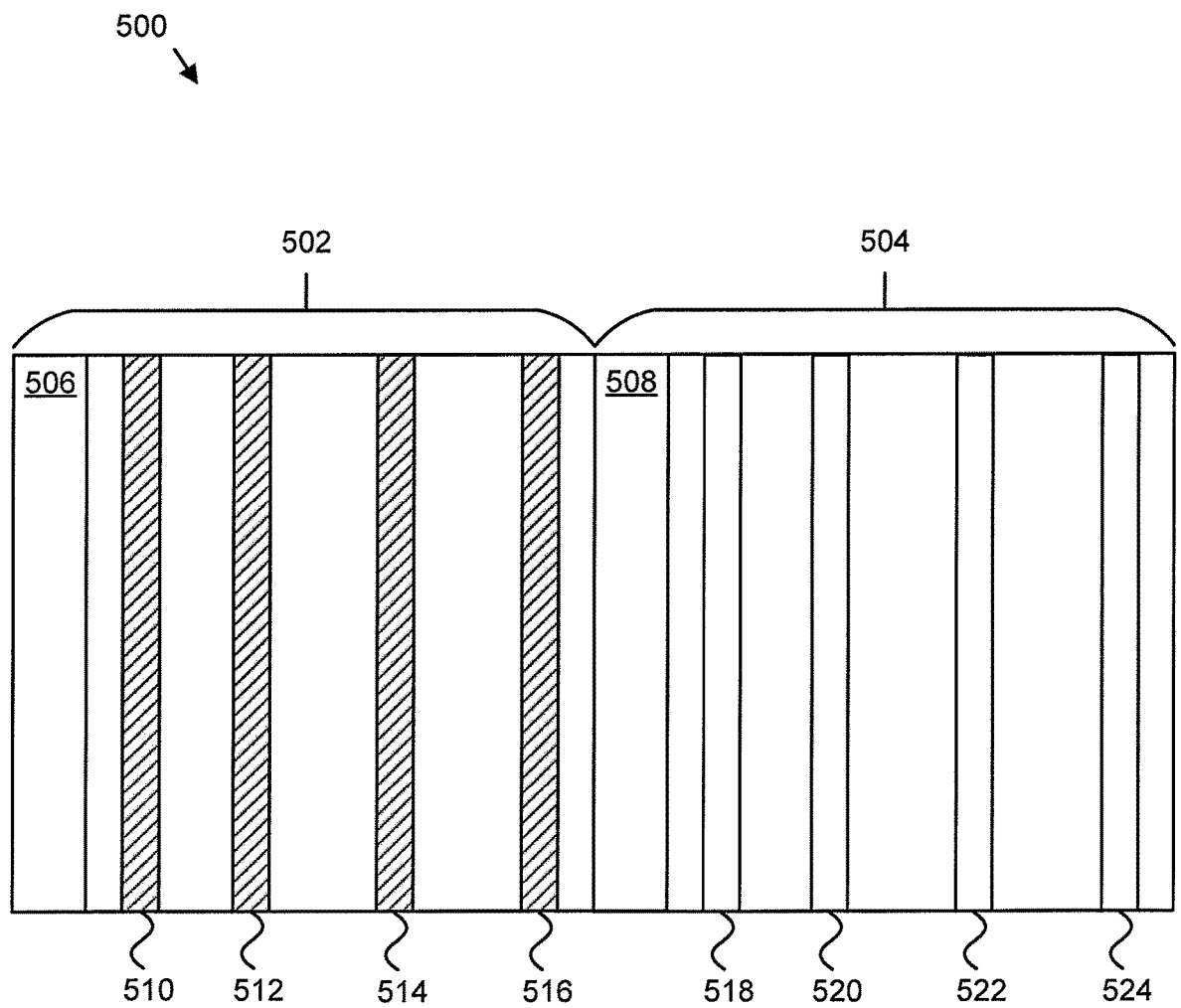
FIG. 5 is a schematic block diagram illustrating one embodiment of communications for dynamic resource reservation.

FIG. 5 is a schematic block diagram illustrating one embodiment of communications 500 for dynamic resource reservation. The communications 500 include a first subframe 502 and a second subframe 504. Moreover, the first subframe 502 includes a first eMBB DL control information 506, and the second subframe 504 includes a second eMBB DL control information 508. Further, the first subframe 502 includes a first possible URLLC resource 510, a second possible URLLC resource 512, a third possible URLLC resource 514, and a fourth possible URLLC resource 516. The second subframe 504 includes a fifth possible URLLC resource 518, a sixth possible URLLC resource 520, a seventh possible URLLC resource 522, and an eighth possible URLLC resource 524. The first eMBB DL control information 506 and/or the second eMBB DL control information 508 may include one or more indicators used to indicate URLLC communication to an eMBB UE.

In some embodiments, the one or more indicators may include a 1 bit indicator that represent whether a URLLC transmission resource pattern is used. The URLLC transmission resource pattern may be predefined or preconfigured for a gNB and an eMBB UE. In one embodiment, the transmission resource pattern may be "1111" to indicate that all possible URLLC resources in a subframe are used. For example, as shown in FIG. 5, if a URLLC resource is used for transmission, the indicator in the first eMBB DL control information 506 may be set to "1" and the indicator in the second eMBB DL control information 508 may be set to "0." Accordingly, the DL or UL eMBB data transmission will not occupy URLLC resources (e.g., the shaded URLLC possible resources—the first possible URLLC resource 510, the second possible URLLC resource 512, the third possible URLLC resource 514, and the fourth possible URLLC resource 516) for eMBB data transmission. In contrast, eMBB data transmission will occupy unused URLLC resources (e.g., the unshaded URLLC possible resources—the fifth possible URLLC resource 518, the sixth possible URLLC resource 520, the seventh possible URLLC resource 522, and the eighth possible URLLC resource 524). The transmission resource pattern may be used to indicate two subslots in one eMBB subframe or four subolts in one eMBB subframe based on a period of URLLC packet generation and transmission, transmission granularity in one subframe, a number of retransmissions, and so forth. The predefined or preconfigured transmission resource pattern facilitates a tradeoff between signaling overhead and scheduling flexibility.

Figure 6:
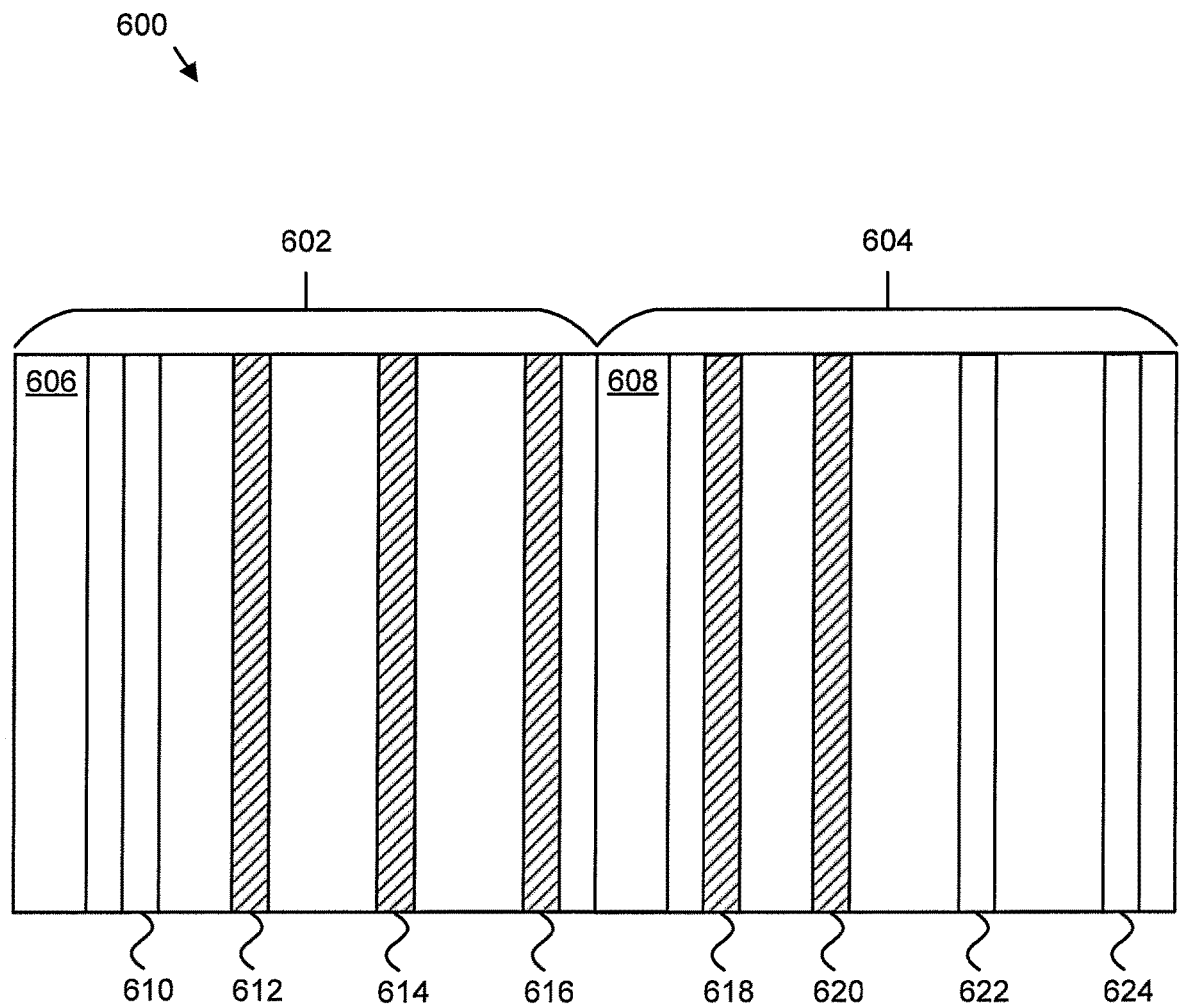
FIG. 6 is a schematic block diagram illustrating another embodiment of communications for dynamic resource reservation.

FIG. 6 is a schematic block diagram illustrating another embodiment of communications 600 for dynamic resource reservation. The communications 600 include a first subframe 602 and a second subframe 604. Moreover, the first subframe 602 includes a first eMBB DL control information 606, and the second subframe 604 includes a second eMBB DL control information 608. Further, the first subframe 602 includes a first possible URLLC resource 610, a second possible URLLC resource 612, a third possible URLLC resource 614, and a fourth possible URLLC resource 616. The second subframe 604 includes a fifth possible URLLC resource 618, a sixth possible URLLC resource 620, a seventh possible URLLC resource 622, and an eighth possible URLLC resource 624. The first eMBB DL control information 606 and/or the second eMBB DL control information 608 may include one or more indicators used to indicate URLLC communication to an eMBB UE.

In various embodiments, the one or more indicators may include multiple bits that correspond to a URLLC transmission pattern and indicate whether possible URLLC resources are used (e.g., in bitmap manner). For example, as shown in FIG. 6, 4 bits indicate 4 possible URLLC transmission subslots in bitmap manner. Specifically, as illustrated, the indicator in the first eMBB DL control information 606 may be set to "0111" and the indicator in the second eMBB DL control information 608 may be set to "1100." Accordingly, the DL or UL eMBB data transmission will not occupy corresponding URLLC resources in the first subframe 602 (e.g., the shaded URLLC possible resources—the second possible URLLC resource 612, the third possible URLLC resource 614, and the fourth possible URLLC resource 616) for eMBB data transmission. In addition, the DL or UL eMBB data transmission will not occupy corresponding URLLC resources in the second subframe 604 (e.g., the shaded URLLC possible resources—the fifth possible URLLC resource 618 and the sixth possible URLLC resource 620). In other embodiments, if the URLLC only transmits in the first and the third subslots, and the second and fourth subslots may be used by eMBB DL/UL transmission, the indicator in the eMBB control information may be set to "1010." In certain embodiments, if the URLLC only transmits in the first three subslots in one subframe, the indicator may be set to "1110." This indication method takes more bits in eMBB control information than the one bit indication, but is able to indicate URLLC transmission subslots more accurately. Moreover, this multiple bit indication may reduce unnecessary waste of resources and improve the spectrum efficiency of eMBB transmissions. The number of indication bits in eMBB control information may be defined based on a payload size of eMBB control information, a period of URLLC packet generation and transmission, transmission granularity in one subframe, available bandwidth in a frequency domain, a number of retransmission, and so forth.

Figure 7:
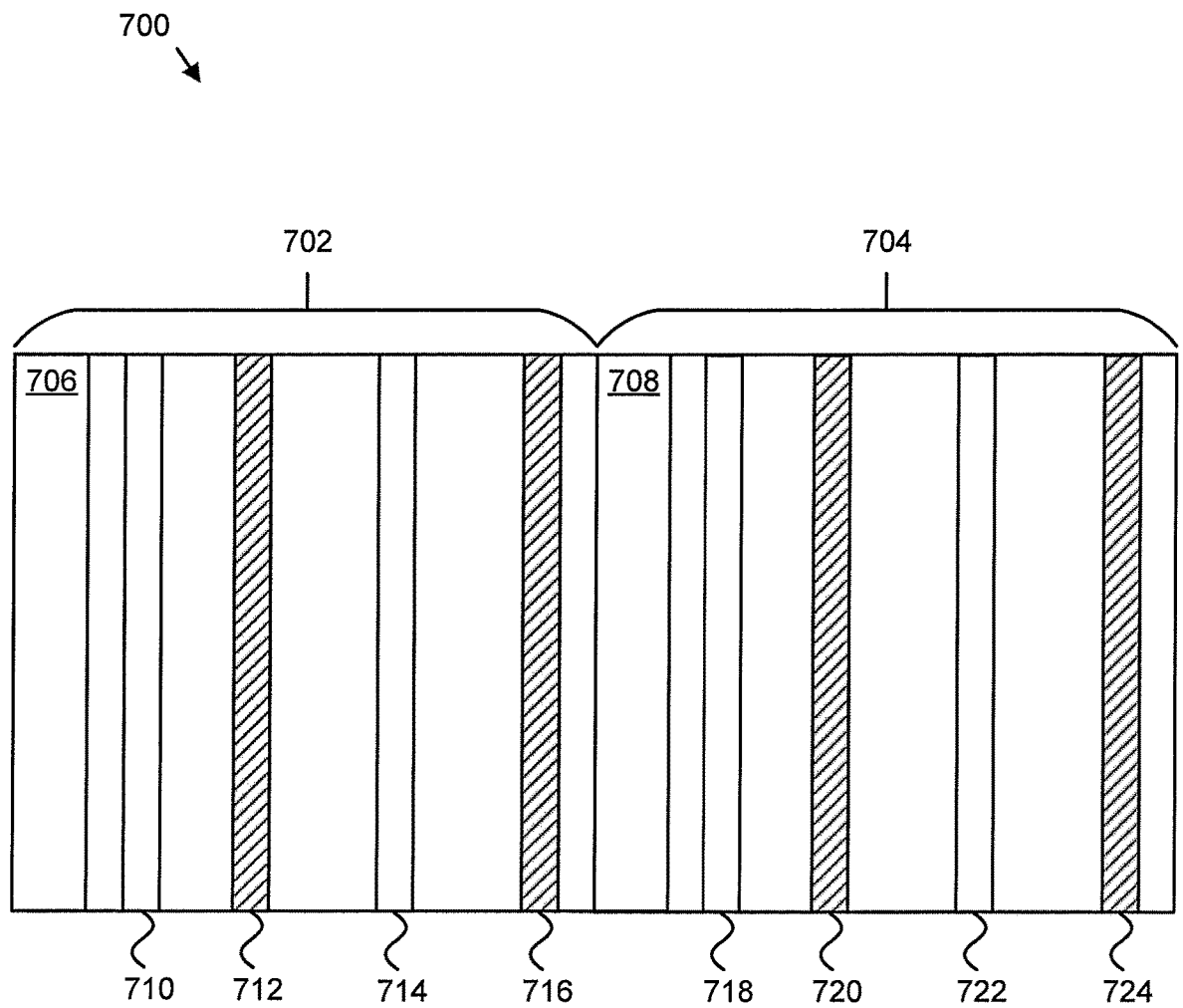
FIG. 7 is a schematic block diagram illustrating a further embodiment of communications for dynamic resource reservation.

FIG. 7 is a schematic block diagram illustrating a further embodiment of communications 700 for dynamic resource reservation. The communications 700 include a first subframe 702 and a second subframe 704. Moreover, the first subframe 702 includes a first eMBB DL control information 706, and the second subframe 704 includes a second eMBB DL control information 708. Further, the first subframe 702 includes a first possible URLLC resource 710, a second possible URLLC resource 712, a third possible URLLC resource 714, and a fourth possible URLLC resource 716. The second subframe 704 includes a fifth possible URLLC resource 718, a sixth possible URLLC resource 720, a seventh possible URLLC resource 722, and an eighth possible URLLC resource 724. The first eMBB DL control information 706 and/or the second eMBB DL control information 708 may include one or more indicators used to indicate URLLC communication to an eMBB UE.

In some embodiments, the one or more indicators may include multiple bits to represent frequently used sets of subslots for URLLC transmission. This may more effectively indicate URLLC transmission subslots with fewer bits than with bitmap indication. For example, Table 1 and Table 2 show the usages of URLLC transmission in one subframe. Each URLLC transmission usage is indicated by 2 bits and 3 bits in the reservation indication field in the eMBB control information in Table 1 and Table 2, respectively. In Table 1 and Table 2, it is assumed that there are 4 potential transmission subslots in one subframe for URLLC transmission, so the length of bits in usage field is 4. Each bit in the usage field represents reserved or not reserved (e.g., "1" represents reserved and "0" represents not reserved in the tables).

For example, in Table 1, "01" in the reservation indication field in the eMBB control information corresponds to usage "0101" and is used to indicate that the second and the fourth subslots are not used for eMBB data transmission in one subframe, meanwhile the first and the third subslots are used for eMBB data transmission, as shown in the first subframe 702 of FIG. 7 (e.g., the shaded URLLC possible resources—the second possible URLLC resource 712 and the fourth possible URLLC resource 716) and the second subframe 704 of FIG. 7 (e.g., the shaded URLLC possible resources—the sixth possible URLLC resource 720 and the eighth possible URLLC resource 724). The shaded URLLC possible resources of the first subframe 702 and the second subframe 704 also work on the case of "101" in Table 2.

TABLE 1

| Value of Reservation Indication Field in eMBB Control Information | URLLC Usage |
|---|---|
| 00 | 0000 |
| 01 | 0101 |

TABLE 1-continued

| Value of Reservation Indication Field in eMBB Control Information | URLLC Usage |
|---|---|
| 10 | 1010 |
| 11 | 1111 |

TABLE 2

| Value of Reservation Indication Field in eMBB Control Information | URLLC Usage |
|---|---|
| 000 | 0000 |
| 001 | 1000 |
| 010 | 1100 |
| 011 | 1110 |
| 100 | 1010 |
| 101 | 0101 |
| 110 | 0111 |
| 111 | 1111 |

Figure 8:
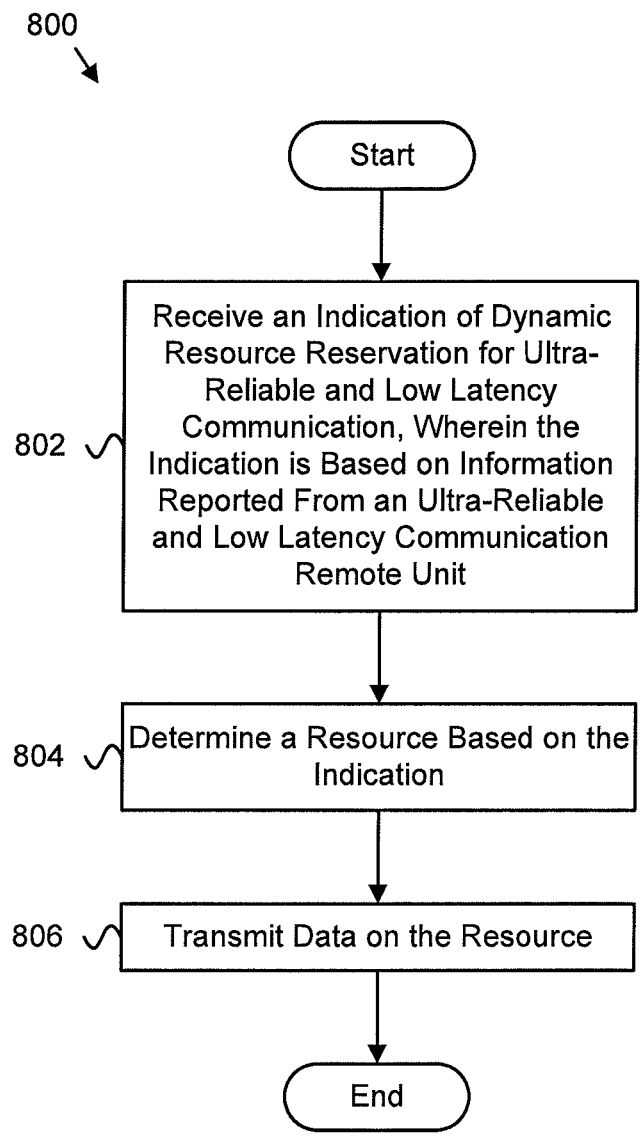
FIG. 8 is a schematic flow chart diagram illustrating one embodiment of a method for dynamic resource reservation.

FIG. 8 is a schematic flow chart diagram illustrating one embodiment of a method 800 for dynamic resource reservation. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 an indication of dynamic resource reservation for ultra-reliable and low latency communication. In certain embodiments, the indication is based on information reported from an ultra-reliable and low latency communication remote unit. The method 800 also includes determining 804 a resource based on the indication. In one embodiment, the method 800 includes transmitting 806 data on the resource.

In one embodiment, the method 800 includes receiving the indication of dynamic resource reservation for ultra-reliable and low latency communication in enhanced mobile broadband control information. In a further embodiment, the indication includes a single bit indicating whether an ultra-reliable and low latency communication resource pattern is used. In certain embodiments, the method 800 includes receiving information indicating the ultra-reliable and low latency communication resource pattern. In some embodiments, the ultra-reliable and low latency communication resource pattern is predefined or preconfigured.

In various embodiments, the indication includes multiple bits indicating a selected ultra-reliable and low latency communication resource pattern of multiple ultra-reliable and low latency communication resource patterns. In some embodiments, the method 800 includes identifying the selected ultra-reliable and low latency communication resource pattern of the multiple ultra-reliable and low latency communication resource patterns using the indication.

Figure 9:
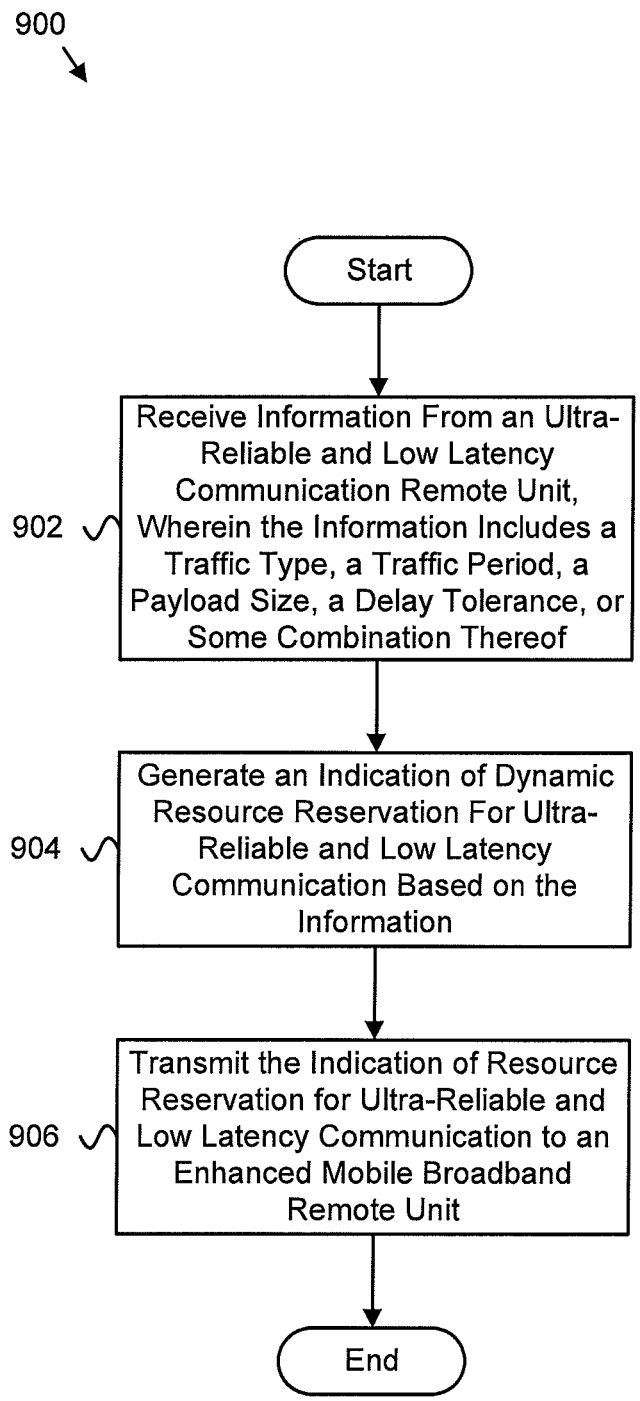
FIG. 9 is a schematic flow chart diagram illustrating another embodiment of a method for dynamic resource reservation.

FIG. 9 is a schematic flow chart diagram illustrating one embodiment of a method 900 for dynamic resource reservation. In some embodiments, the method 900 is performed by an apparatus, such as the base unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 information from an ultra-reliable and low latency communication remote unit. In certain embodiments, the information includes a traffic type, a traffic period, a payload size, a delay tolerance, or some combination thereof. The method 900 also includes generating 904 an indication of dynamic resource reservation for ultra-reliable and low latency communication based on the information. The method 900 includes transmitting 906 the indication of dynamic resource reservation for ultra-reliable and low latency communication to an enhanced mobile broadband remote unit.

In one embodiment, the method 900 includes transmitting the indication of dynamic resource reservation for ultra-reliable and low latency communication in enhanced mobile broadband control information. In a further embodiment, the indication includes a single bit indicating whether an ultra-reliable and low latency communication resource pattern is used. In certain embodiments, the method 900 includes transmitting information indicating the ultra-reliable and low latency communication resource pattern. In some embodiments, the ultra-reliable and low latency communication resource pattern is predefined or preconfigured. In various embodiments, the indication includes multiple bits indicating a selected ultra-reliable and low latency communication resource pattern of multiple ultra-reliable and low latency communication resource patterns.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a first user equipment, the apparatus further comprising:
   a receiver that receives an indication of resource reservation for uplink communication, wherein the indication is based on information reported from a second user equipment, the indication of resource reservation is for a combination of enhanced mobile broadband communication and ultra-reliable and low latency communication, the indication indicates an uplink communication resource pattern, and the uplink communication resource pattern identifies one or more time resources for enhanced mobile broadband communication and one or more time resources for ultra-reliable and low latency communication;
   a processor that determines a resource based on the indication, wherein the resource comprises a combination of an enhanced mobile broadband communication resource and an ultra-reliable and low latency communication resource; and
   a transmitter that transmits data on the resource.

2. The apparatus of claim 1, wherein the receiver receives the indication of resource reservation for uplink communication in downlink control information.

3. The apparatus of claim 1, wherein the indication comprises a single bit indicating whether the uplink communication resource pattern is used.

4. The apparatus of claim 3, wherein the uplink communication resource pattern is predefined or preconfigured.

5. The apparatus of claim 1, wherein the indication comprises a plurality of bits indicating a selected uplink communication resource pattern of a plurality of uplink communication resource patterns.

6. The apparatus of claim 5, wherein the processor identifies the selected uplink communication resource pattern of the plurality of uplink communication resource patterns using the indication.

7. A method comprising:
receiving, at a first user equipment, an indication of resource reservation for uplink communication, wherein the indication is based on information reported from a second user equipment, the indication of resource reservation is for a combination of enhanced mobile broadband communication and ultra-reliable and low latency communication, the indication indicates an uplink communication resource pattern, and the uplink communication resource pattern identifies one or more time resources for enhanced mobile broadband communication and one or more time resources for ultra-reliable and low latency communication;
determining a resource based on the indication, wherein the resource comprises a combination of an enhanced mobile broadband communication resource and an ultra-reliable and low latency communication resource; and
transmitting data on the resource.

8. The method of claim 7, wherein receiving the indication of resource reservation for uplink communication further comprises receiving the indication of dynamic resource reservation for uplink communication in downlink control information.

9. The method of claim 7, wherein the indication comprises a single bit indicating whether the uplink communication resource pattern is used.

10. The method of claim 9, wherein the uplink communication resource pattern is predefined or preconfigured.

11. The method of claim 7, wherein the indication comprises a plurality of bits indicating a selected uplink communication resource pattern of a plurality of uplink communication resource patterns.

12. The method of claim 11, wherein determining the resource reservation based on the indication further comprises identifying the selected uplink communication resource pattern of the plurality of uplink communication resource patterns using the indication.

13. An apparatus comprising a base station, the apparatus further comprising:
a receiver that receives information from a first user equipment, wherein the information comprises a traffic type, a traffic period, a payload size, a delay tolerance, or some combination thereof;
a processor that generates an indication of resource reservation for uplink communication based on the information, wherein the indication of resource reservation is for a combination of enhanced mobile broadband communication and ultra-reliable and low latency communication, the indication indicates an uplink communication resource pattern, and the uplink communication resource pattern identifies one or more time resources for enhanced mobile broadband communication and one or more time resources for ultra-reliable and low latency communication; and
a transmitter that transmits the indication of resource reservation for uplink communication to a second user equipment.

14. The apparatus of claim 13, wherein the transmitter transmits the indication of resource reservation for uplink communication in downlink control information.

15. The apparatus of claim 13, wherein the indication comprises a single bit indicating whether the uplink communication resource pattern is used.

16. The apparatus of claim 15, wherein the uplink communication resource pattern is predefined or preconfigured.

17. The apparatus of claim 13, wherein the indication comprises a plurality of bits indicating a selected uplink communication resource pattern of a plurality of uplink communication resource patterns.

18. A method comprising:
receiving, at a base station, information from a first user equipment, wherein the information comprises a traffic type, a traffic period, a payload size, a delay tolerance, or some combination thereof;
generating an indication of resource reservation for uplink communication based on the information, wherein the indication of resource reservation is for a combination of enhanced mobile broadband communication and ultra-reliable and low latency communication, the indication indicates an uplink communication resource pattern, and the uplink communication resource pattern identifies one or more time resources for enhanced mobile broadband communication and one or more time resources for ultra-reliable and low latency communication; and
transmitting the indication of resource reservation for uplink communication to a second user equipment.

19. The method of claim 18, wherein transmitting the indication of resource reservation for uplink communication further comprises transmitting the indication of dynamic resource reservation for uplink communication in downlink control information.

20. The method of claim 18, wherein the indication comprises a single bit indicating whether the uplink communication resource pattern is used.

21. The method of claim 20, wherein the uplink communication resource pattern is predefined or preconfigured.

22. The method of claim 18, wherein the indication comprises a plurality of bits indicating a selected uplink communication resource pattern of a plurality of uplink communication resource patterns.

* * * * *